(12) United States Patent
Chorian et al.

(10) Patent No.: US 9,281,673 B2
(45) Date of Patent: Mar. 8, 2016

(54) DEFORMABLE BUSBAR ASSEMBLY AND BUS BAR INSTALLATION METHOD

(71) Applicant: Ford Global Technologies, LLC, Dearborn, MI (US)

(72) Inventors: Steve F. Chorian, Canton, MI (US); Debbi Callicoat, Livonia, MI (US); David J. Chesney, Northville, MI (US); David Wardzala, Canton, MI (US); Yongcai Wang, Troy, MI (US); Yunan Guo, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 14/244,592

(22) Filed: Apr. 3, 2014

(65) Prior Publication Data

US 2015/0288159 A1  Oct. 8, 2015

(51) Int. Cl.
*H02G 5/02* (2006.01)
*B23K 20/00* (2006.01)
*B23K 31/02* (2006.01)
*H01R 43/02* (2006.01)

(52) U.S. Cl.
CPC .............. *H02G 5/025* (2013.01); *B23K 20/002* (2013.01); *B23K 31/02* (2013.01); *H01R 43/02* (2013.01); *Y10S 903/951* (2013.01); *Y10T 29/49181* (2015.01)

(58) Field of Classification Search
CPC .... Y02E 60/12; H01R 13/6315; H01R 12/57; H01M 2/206
See application file for complete search history.

(56) References Cited

U.S. PATENT DOCUMENTS

| | | | |
|---|---|---|---|
| 6,935,020 B2 | 8/2005 | Ikeda | |
| 7,229,327 B2* | 6/2007 | Zhao et al. | 439/840 |
| 7,651,801 B2 | 1/2010 | Draper et al. | |
| 8,501,340 B2* | 8/2013 | Kim | 429/160 |
| 8,545,271 B2* | 10/2013 | Henmi | 439/627 |
| 8,574,008 B2* | 11/2013 | Große et al. | 439/627 |
| 8,721,368 B2* | 5/2014 | Zhao | 439/627 |
| 8,777,668 B2* | 7/2014 | Ikeda et al. | 439/627 |
| 2006/0194101 A1* | 8/2006 | Ha et al. | 429/158 |
| 2006/0270277 A1* | 11/2006 | Zhao et al. | 439/627 |
| 2013/0143446 A1* | 6/2013 | Kobayashi et al. | 439/627 |
| 2014/0154924 A1* | 6/2014 | Huang et al. | 439/627 |

* cited by examiner

*Primary Examiner* — Gary Paumen
(74) *Attorney, Agent, or Firm* — David Kelley, Esq.; Tung & Associates

(57) ABSTRACT

A bus bar assembly includes a deformable bus bar including a bus bar positive terminal flange, a bus bar negative terminal flange spaced-apart from the bus bar positive terminal flange and a flange connecting portion connecting the bus bar positive terminal flange and the bus bar negative terminal flange. A deformable bus bar frame includes a bus bar frame positive terminal flange carried by the bus bar positive terminal flange of the deformable bus bar and a bus bar frame negative terminal flange carried by the bus bar negative terminal flange of the deformable bus bar. A method of installing a deformable bus bar on positive and negative terminals of a battery cell is also disclosed.

18 Claims, 2 Drawing Sheets

DEFORMABLE BUSBAR ASSEMBLY AND BUS BAR INSTALLATION METHOD

FIELD

Illustrative embodiments of the disclosure generally relate to electrical bus bars for electric vehicles (EVs). More particularly, illustrative embodiments of the disclosure relate to a deformable bus bar assembly and a bus bar installation method which compensate for differences in height between adjacent terminals on an HV battery.

BACKGROUND

Bus bars for HV (hybrid vehicle) battery arrays may be attached via studs on the battery cells. Nuts may be threaded and tightened on the studs to form a strong, electrically-conductive joint. The studs may be used to locate the bus bars in the correct location for contact of the bus bars with the cell terminal on the battery cell.

In some applications, it may be desirable to attach the bus bars to the cell terminals on the battery cell via welding. However, there may be differences in height between the positive and negative terminals on the battery cell. This may leave gaps between the bus bars and the terminals, compromising the integrity of the welds which secure the bus bars to the cell terminals.

Accordingly, a deformable bus bar assembly and a bus bar installation method which compensate for differences in height between adjacent terminals on an HV battery may be desirable.

SUMMARY

Illustrative embodiments of the disclosure are generally directed to a deformable bus bar assembly which compensates for differences in height between adjacent terminals on an HV battery. An illustrative embodiment of the bus bar assembly includes a deformable bus bar having a bus bar positive terminal flange, a bus bar negative terminal flange spaced-apart from the bus bar positive terminal flange and a flange connecting portion connecting the bus bar positive terminal flange and the bus bar negative terminal flange. A bus bar frame includes a bus bar frame positive terminal flange carried by the bus bar positive terminal flange of the deformable bus bar and a bus bar frame negative terminal flange carried by the bus bar negative terminal flange of the deformable bus bar.

Illustrative embodiments of the disclosure are further generally directed to a method of installing a deformable bus bar on positive and negative terminals of a battery cell. An illustrative embodiment of the method includes placing spaced-apart bus bar positive and negative terminal flanges of a deformable bus bar on the positive and negative terminals, respectively, of the battery cell; and applying pressure against one of the bus bar positive and negative terminal flanges of the deformable bus bar to deform the deformable bus bar until the one of the bus bar positive and negative terminal flanges contacts a corresponding one of the positive and negative terminals, respectively, of the battery cell.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
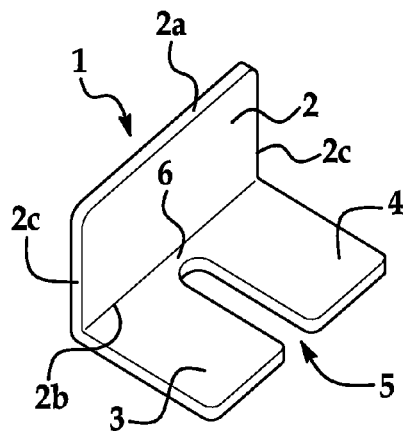
FIG. 1 is a perspective view of an exemplary deformable bus bar.
Figure 2:
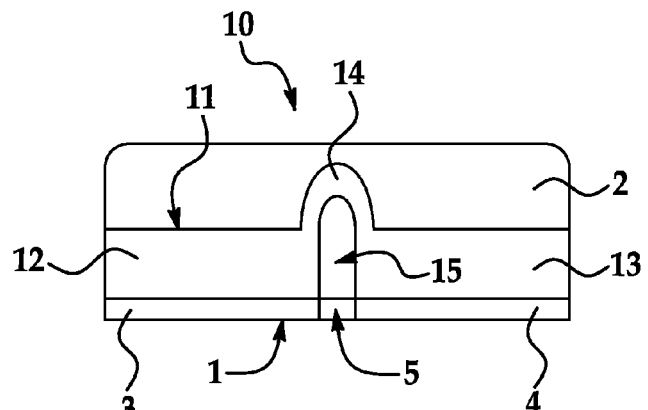
FIG. 2 is a front view of an illustrative embodiment of a deformable bus bar assembly having the exemplary deformable bus bar illustrated in FIG. 1.

Referring initially to FIGS. 1 and 2, an exemplary deformable bus bar 1 (FIG. 1) which is suitable for an illustrative embodiment of a deformable bus bar assembly 10 (FIG. 2) is shown. The deformable bus bar 1 may include any suitable flexible or deformable and electrically conductive material. The deformable bus bar 1 may include a bus bar body 2. In some embodiments, the bus bar body 2 may be generally elongated and rectangular with a pair of parallel longitudinal body edges 2a, 2b, respectively, and transverse body edges 2c extending between the longitudinal body edges 2a, 2b. A bus bar positive terminal flange 3 and a bus bar negative terminal flange 4 extend from the bus bar body 2 in spaced-apart relationship to each other along the longitudinal body edge 2b. A bus bar slot 5 may extend between the bus bar positive terminal flange 3 and the bus bar negative terminal flange 4. A flange connecting portion 6 may connect the bus bar positive terminal flange 3 and the bus bar negative terminal flange 4 between the bus bar slot 5 and the bus bar body 2.

As shown in FIG. 2, in exemplary application, which will be hereinafter described, the deformable bus bar 1 may be included as part of the deformable bus bar assembly 10. The deformable bus bar assembly 10 may include a deformable bus bar frame 11 which may be plastic or other deformable material. The bus bar frame 11 may include a bus bar frame positive terminal flange 12 and a bus bar frame negative terminal flange 13. A bus bar frame flange connector 14 may connect the bus bar frame positive terminal flange 12 and the bus bar frame negative terminal flange 13. A bus bar flange slot 15 may separate the bus bar frame positive terminal flange 12 and the bus bar frame negative terminal flange 13 at the bus bar frame flange connector 14. Accordingly, the bus bar frame positive terminal flange 12 and the bus bar frame negative terminal flange 13 of the bus bar frame 11 may rest on the bus bar positive terminal flange 3 and the bus bar negative terminal flange 4, respectively, of the deformable bus bar 1, with the bus bar slot 5 of the deformable bus bar 1 registering with the bus bar frame flange slot 15 of the bus bar frame 11.

Figure 3:
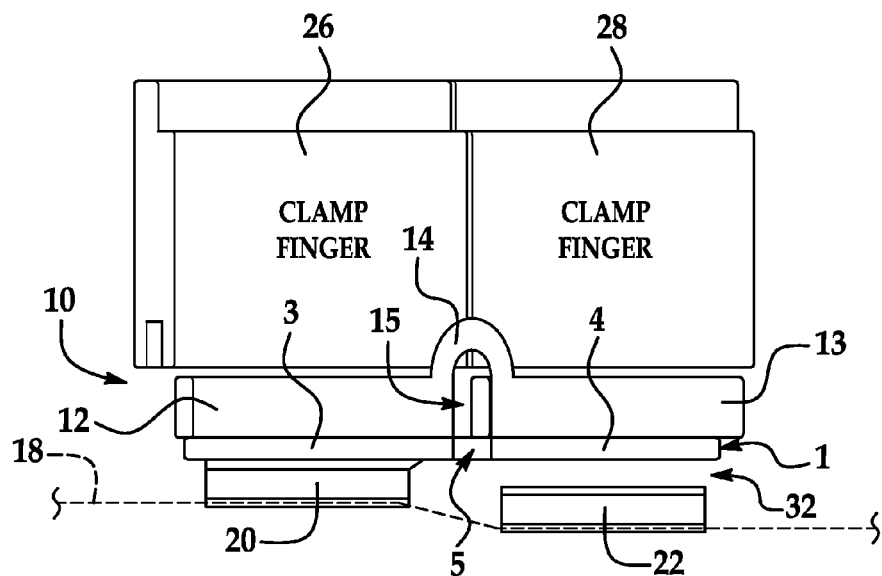
FIG. 3 is a front view of the illustrative deformable bus bar assembly clamped onto a positive terminal and a negative terminal of a battery cell, with an electrode gap initially existing between the negative terminal and the deformable bus bar due to a difference in height between the positive terminal and the negative terminal in installation of the deformable bus bar.
Figure 4:
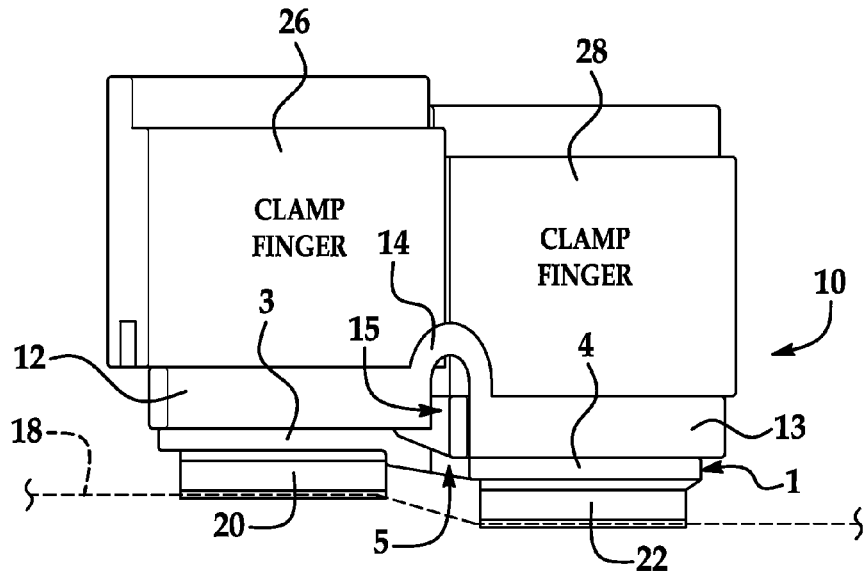
FIG. 4 is a front view of an illustrative deformable bus bar assembly with the deformable bus bar deformed to accommodate the difference in height between the positive terminal and the negative terminal.

Referring next to FIGS. 3 and 4, in exemplary application of the deformable bus bar 1, the deformable bus bar assembly 10 is placed on a battery cell 18 of an HV vehicle. The battery cell 18 may be a conventional battery cell which is used to provide a source of electrical power to an EV (Electric Vehicle). The battery cell 18 may have a positive terminal 20 and a negative terminal 22 which are offset from each other, or different in height. The bus bar positive terminal flange 3 of the deformable bus bar 1 engages the positive terminal 20 of the battery cell 18. However, due to the difference in height between the positive terminal 20 and the negative terminal 22 of the battery cell 18, a contact gap 32 exists between the bus bar negative terminal flange 4 of the deformable bus bar 1 and the negative terminal 22 of the battery cell 18. A positive terminal clamp finger 26 and a negative terminal clamp finger 28 may secure the deformable bus bar assembly 10 on the positive terminal 20 and the negative terminal 22 of the battery cell 18 as is known by those skilled in the art.

As illustrated in FIG. 4, the negative terminal clamp finger 28 is tightened to progressively deform the bus bar frame negative terminal flange 13 at the bus bar frame flange connector 14 of the bus bar frame 11 and the underlying bus bar negative terminal flange 4 at the bus bar slot 5 and flange connecting portion 6 of the deformable bus bar 1. Therefore, the bus bar negative terminal flange 4 and the bus bar frame negative terminal flange 13 traverse the contact gap 32 (FIG. 3) until the bus bar negative terminal flange 4 makes solid contact or engagement with the negative terminal 22 of the battery cell 18. The bus bar positive terminal flange 3 and the bus bar negative terminal flange 4 can then be welded to the positive terminal 20 and the negative terminal 22, respectively.

It will be appreciated by those skilled in the art that the deformable bus bar 1 can be deformed to compensate for the difference in height between adjacent terminals on a battery cell responsive to application of pressure to the deformable bus bar. Compared to conventional bus bars, the deformable bus bar may result in significant reduction or elimination of a contact gap between the bus bar and the positive or negative terminal on a battery cell. Because the deformable bus bar requires substantially less clamp force which is necessary to be applied for deformation to reduce or eliminate the contact gap, the total pressure which is necessary to be applied on the battery array or pack during the welding operation is substantially reduced. This expedient may reduce the risk of damaging the battery array or pack due to overload forces. In addition, the flexibility of this busbar lowers any peel or sheer forces seen on the welds due to any movement of the cells after welding. These movements could be caused by handling of the battery cell array after welding assembly into the battery pack, and during life of the battery pack in the vehicle.

Figure 5:
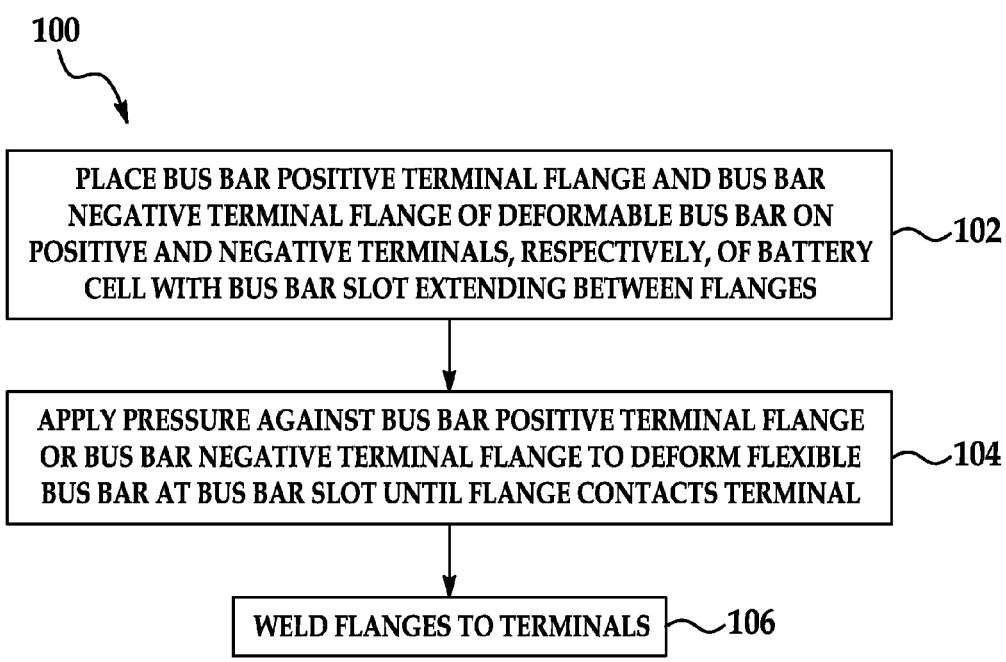
FIG. 5 is a flow diagram of an illustrative embodiment of a deformable bus bar installation method.

Referring next to FIG. 5, a flow diagram 500 of an illustrative embodiment of a deformable bus bar installation method is shown. At block 102, a bus bar positive terminal flange and a bus bar negative terminal flange of a deformable bus bar are placed on positive and negative terminals, respectively, of a battery cell. A bus bar slot extends between the bus bar positive terminal flange and the bus bar negative terminal flange. A contact gap exists between the bus bar positive terminal flange and the positive terminal and the bus bar negative terminal flange and the negative terminal.

At block 104, pressure is applied against the bus bar positive terminal flange or the bus bar negative terminal flange of the deformable bus bar. In some embodiments, a bus bar frame may be placed on the deformable bus bar and the pressure may be applied to the bus bar frame. The deformable bus bar deforms at the bus bar slot until the bus bar positive terminal flange or the bus bar negative terminal flange traverses the contact gap and makes solid contact with the corresponding positive terminal or negative terminal, respectively. At block 106, the bus bar positive terminal flange and the bus bar negative terminal flange of the deformable bus bar may be welded to the positive and negative terminals, respectively, of the battery cell.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A bus bar assembly comprising:
    a deformable bus bar having a bus bar slot separating a bus bar positive terminal flange and a bus bar negative terminal flange allowing said two flanges moving independently against each other; and
    a deformable bus bar frame having a bus bar frame flange connector connecting a bus bar frame positive terminal flange and a bus bar frame negative terminal flange of the bus bar frame.

2. The bus bar assembly of claim 1 further comprising a bus bar frame flange slot separating the bus bar frame positive terminal flange and the bus bar frame negative terminal flange at the bus bar frame flange connector of the bus bar frame.

3. The bus bar assembly of claim 1 further comprising a bus bar body, and wherein the bus bar positive terminal flange and the bus bar negative terminal flange extend from the bus bar body.

4. The bus bar assembly of claim 3 wherein the bus bar body is generally elongated.

5. The bus bar assembly of claim 4 wherein the bus bar body comprises a pair of longitudinal body edges and a pair of transverse body edges, and the bus bar positive terminal flange and the bus bar negative terminal flange extend from the bus bar body along one of the longitudinal body edges.

6. The bus bar assembly of claim 3 wherein the bus bar body is generally rectangular.

7. The bus bar assembly of claim 1 wherein the bus bar frame comprises plastic.

8. A bus bar assembly, comprising:
    a deformable bus bar including:
        a bus bar positive terminal flange;
        a bus bar negative terminal flange spaced-apart from the bus bar positive terminal flange;
        a flange connecting portion connecting the bus bar positive terminal flange and the bus bar negative terminal flange; and
        a bus bar slot separating the bus bar positive terminal flange and the bus bar negative terminal flange at the flange connecting portion; and
    a deformable bus bar frame including:
        a bus bar frame positive terminal flange carried by the bus bar positive terminal flange of the deformable bus bar; and a bus bar frame negative terminal flange carried by the bus bar negative terminal flange of the deformable bus bar.

9. The bus bar assembly of claim 8 further comprising a bus bar frame flange connector connecting the bus bar frame positive terminal flange and the bus bar frame negative terminal flange of the bus bar frame.

10. The bus bar assembly of claim 9 further comprising a bus bar frame flange slot separating the bus bar frame positive terminal flange and the bus bar frame negative terminal flange at the bus bar frame flange connector of the bus bar frame.

11. The bus bar assembly of claim 8 further comprising a bus bar body, and wherein the bus bar positive terminal flange and the bus bar negative terminal flange extend from the bus bar body.

12. The bus bar assembly of claim 11 wherein the bus bar body is generally elongated.

13. The bus bar assembly of claim 12 wherein the bus bar body comprises a pair of longitudinal body edges and a pair of transverse body edges, and the bus bar positive terminal flange and the bus bar negative terminal flange extend from the bus bar body along one of the longitudinal body edges.

14. The bus bar assembly of claim 11 wherein the bus bar body is generally rectangular.

15. The bus bar assembly of claim 8 wherein the bus bar frame comprises plastic.

16. A method of installing a deformable bus bar on positive and negative terminals of a battery cell, comprising:
   placing spaced-apart bus bar positive and negative terminal flanges of a deformable bus bar on the positive and negative terminals, respectively, of the battery cell;
   placing a bus bar frame on said deformable bus bar; and
   applying pressure against one of the bus bar positive and negative terminal flanges of the deformable bus bar comprising applying pressure against said bus bar frame to deform the deformable bus bar until the one of the bus bar positive and negative terminal flanges contacts a corresponding one of the positive and negative terminals, respectively, of the battery cell.

17. The method of claim 16 wherein applying pressure against one of the bus bar positive and negative terminal flanges of the deformable bus bar comprises applying clamp pressure against one of the bus bar positive and negative terminal flanges of the deformable bus bar.

18. The method of claim 16 further comprising welding the bus bar positive and negative terminal flanges of the deformable bus bar to the positive and negative terminals, respectively, of the battery cell.

* * * * *